US006985665B2

(12) United States Patent
Baechtle

(10) Patent No.: US 6,985,665 B2
(45) Date of Patent: Jan. 10, 2006

(54) STRAIN RELIEF UNIT FOR FIBER SHUFFLING DEVICE

(75) Inventor: David Robert Baechtle, Dillsburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 259 days.

(21) Appl. No.: 10/320,058

(22) Filed: Dec. 16, 2002

(65) Prior Publication Data

US 2004/0114901 A1 Jun. 17, 2004

(51) Int. Cl.
*G02B 6/44* (2006.01)

(52) U.S. Cl. .................................... 385/136; 385/134

(58) Field of Classification Search .................. 385/15, 385/31, 48, 52–99, 136–137
See application file for complete search history.

(56) References Cited

U.S. PATENT DOCUMENTS 5,471,555 A * 11/1995 Braga et al. ................ 385/136
6,072,932 A * 6/2000 Bennett et al. ............. 385/139
6,421,493 B1 * 7/2002 Burek et al. ................ 385/134
6,464,404 B1 * 10/2002 Robinson et al. ............. 385/54
6,571,048 B1 * 5/2003 Bechamps et al. .......... 385/136
6,623,173 B1 * 9/2003 Grois et al. ................... 385/76
2002/0106161 A1 * 8/2002 Kiani .......................... 385/53

* cited by examiner

*Primary Examiner*—Michelle R. Connelly-Cushwa

(57) ABSTRACT

A strain relief unit for a fiber shuffling device including a first attachment member adapted for attaching to the fiber shuffling device and a second attachment member connected to said first attachment member and adapted for attaching to a portion of a jacket of an optical fiber. The first and second attachment members may be connected by a support member. The strain relief unit directly connects a jacket of the optical fiber to the fiber shuffling device to relieve the jacketed fiber/ribbon of any load imposed thereon. The strain relief unit defines internal channels from the fiber shuffling device to an opening for receiving the jacketed fiber to limit the optical fiber/ribbon bend radiuses to acceptable levels.

19 Claims, 4 Drawing Sheets

STRAIN RELIEF UNIT FOR FIBER SHUFFLING DEVICE

FIELD OF THE INVENTION

The present invention relates to a device for providing strain relief to optical fibers routed through a fiber shuffling device.

DISCUSSION OF RELATED ART

Bundles of four, eight or twelve optical fibers are often fused or otherwise bound together in a ribbon. Multi-fiber connectors, such as MT-type connectors, are used to effect a connection between two bundles of fibers or between a bundle of fibers and a device. In the construction of optical fiber circuits using multiple ribbons, it is often necessary to reorganize the fibers such that a fiber bundled as part of one ribbon in one part of the circuit becomes bundled as part of another ribbon in another part of the circuit.

FIG. 1 shows an example of a portion of such an optical fiber circuit 10 having four input signal ribbons 14, 16, 18 and 20 each having four optical fibers 14*a*–14*d*, 16*a*–16 *d*, 18*a*–18*d* and 20*a*–20*d*, respectively. The circuit portion 10 also has four output signal ribbons 22, 24, 26 and 28, each having four optical fibers 22*a*–22*d*, 24*a*–24*d*, 26*a*–26 *d* and 28*a*–28*d*, respectively. In this exemplary circuit portion, it is desired to rearrange the optical fibers such that each input optical fiber of a ribbon becomes a fiber in a different output ribbon according to the pattern shown in FIG. 1 and described in detail in Table 1 below.

TABLE 1

Optical Fiber Reorganization Pattern

| Input Fiber | Becomes | Output Fiber |
|---|---|---|
| 14a | | 22a |
| 14b | | 24a |
| 14c | | 26a |
| 14d | | 28a |
| 16a | | 22b |
| 16b | | 24b |
| 16c | | 26b |
| 16d | | 28b |
| 18a | | 22c |
| 18b | | 24c |
| 18c | | 26c |
| 18d | | 28c |
| 20a | | 22d |
| 20b | | 24d |
| 20c | | 26d |
| 20d | | 28d |

Other patterns of optical fiber reorganization are, of course, feasible and the pattern will generally be determined by the requirements of the system of which the particular circuit portion is a part.

Various fiber shuffling devices are known for effecting such complex patterns of reorganization between optical fibers of various ribbons. One such fiber shuffling device is the Schott Optical Shuffle™ device manufactured and/or distributed by Schott Fiber Optics, Inc. of Southbridge, Mass., U.S.A., and disclosed in U.S. Pat. No. 6,464,404 B1 to Robinson et al., the entire disclosure of which is hereby incorporated herein by reference. Another exemplary fiber optic shuffling device is the Concours NP™ Optical Circuit device manufactured and/or distributed by US Conec Ltd. of Hickory, N.C. An exemplary Schott Optical Shuffle™ device 40 is shown in FIG. 2. Such a device 40 is typical of fiber shuffling devices in that a plurality of fibers are arranged in a given bundled orientation at a first side 40*a* of the device 40, are arranged within the device 40, and are rearranged in a different bundled orientation at a second side 40*b* of the device 40 such that at least one bundle on the second side 40*b* of the device 40 includes fibers from at least two different bundles on the first side 40*a* of the device 40. While it should be understood that light may propagate in either of opposite longitudinal directions along a given fiber, an example is provided below with reference to FIG. 1, wherein the first side and second sides are discussed in the context of "input" and "output" sides for illustrative purposes, without regard to the direction of light propagation along the fibers.

Referring now to FIGS. 1 and 2, the exemplary device 40 receives multiple input ribbons 14, 16, 18, 20, each comprising multiple optical fibers as described above. Multiple output ribbons 22, 24, 26, 28 extend out from the device 40, each having selected optical fibers from the input ribbons. The output optical fibers are the input optical fibers reorganized into different output ribbons to effect the desired connectivity required for a particular circuit, for example, the connectivity of Table 1. A significant advantage is realized when such reorganization is accomplished without the use of optical interfaces, since such optical interfaces cause losses in the signal transmission.

A fiber shuffling device, such as the Schott Optical Shuffle™ device 40 of FIG. 2, works with "bare" ribbon, i.e., ribbon having no external covering or jacket over the optical fibers. While bare ribbon is acceptable for use within a cabinet or other form of shielding, it is preferred that ribbon exposed to ambient conditions have a protective outer jacket that shields the optical fibers from physical damage. Typical jackets are made of an extruded plastic material, preferably PVC, and may include additional protective layers, such as a woven inner sleeve of aramid fibers for improved tensile strength.

Applicant has recognized, however, a problem with jacketed ribbons exiting fiber shuffling devices such as the Schott Optical Shuffle™ device. Specifically, there is no direct connection between the jackets and the device, and any load imposed on the jacketed ribbons is borne by the length of ribbon between the end of the fiber shuffling device and the beginning of the jackets. This is problematic since the optical fibers of the ribbons are not designed to bear significant tensile loads and are therefore more prone to damage and impaired optical performance. Furthermore, Applicant has recognized the presence of the jacket significantly increases the bending stiffness of the ribbon, and, when bending loads are imposed on the jacketed ribbons, most of the bending occurs over the un-jacketed, bare portion of the ribbon. Bending of the optical fibers should also be avoided because it can degrade the optical performance of the fibers.

Accordingly, Applicant has identified a need for strain relief for fiber shuffling devices so that jacketed ribbon may be used in conjunction with such devices while protecting the optical fibers from excessive bending or tensile loads and thus avoid or mitigate adverse effects on optical performance.

SUMMARY OF THE INVENTION

The present invention provides a strain relief unit for use in conjunction with a fiber shuffling device. The strain relief unit includes a first attachment member adapted for attaching to the fiber shuffling device and a second attachment member connected to said first attachment member, e.g. by a support member, and adapted for attaching to a portion of a jacket of an optical fiber. In this manner, the strain relief unit provides a direct connection between the jacket(s) of the optical fiber(s) and the fiber shuffling device. Any load imposed on the jacketed fiber/ribbon is borne by the strain relief unit, rather than the length of ribbon between the end of the fiber shuffling device and the beginning of the fiber's jacket.

The strain relief unit may also include internal channels extending from the fiber shuffling device to an opening for receiving the jacketed fiber. In this manner, the strain relief unit manages the optical fiber bend radiuses to prevent signal propagation losses.

DETAILED DESCRIPTION

Figure 2:
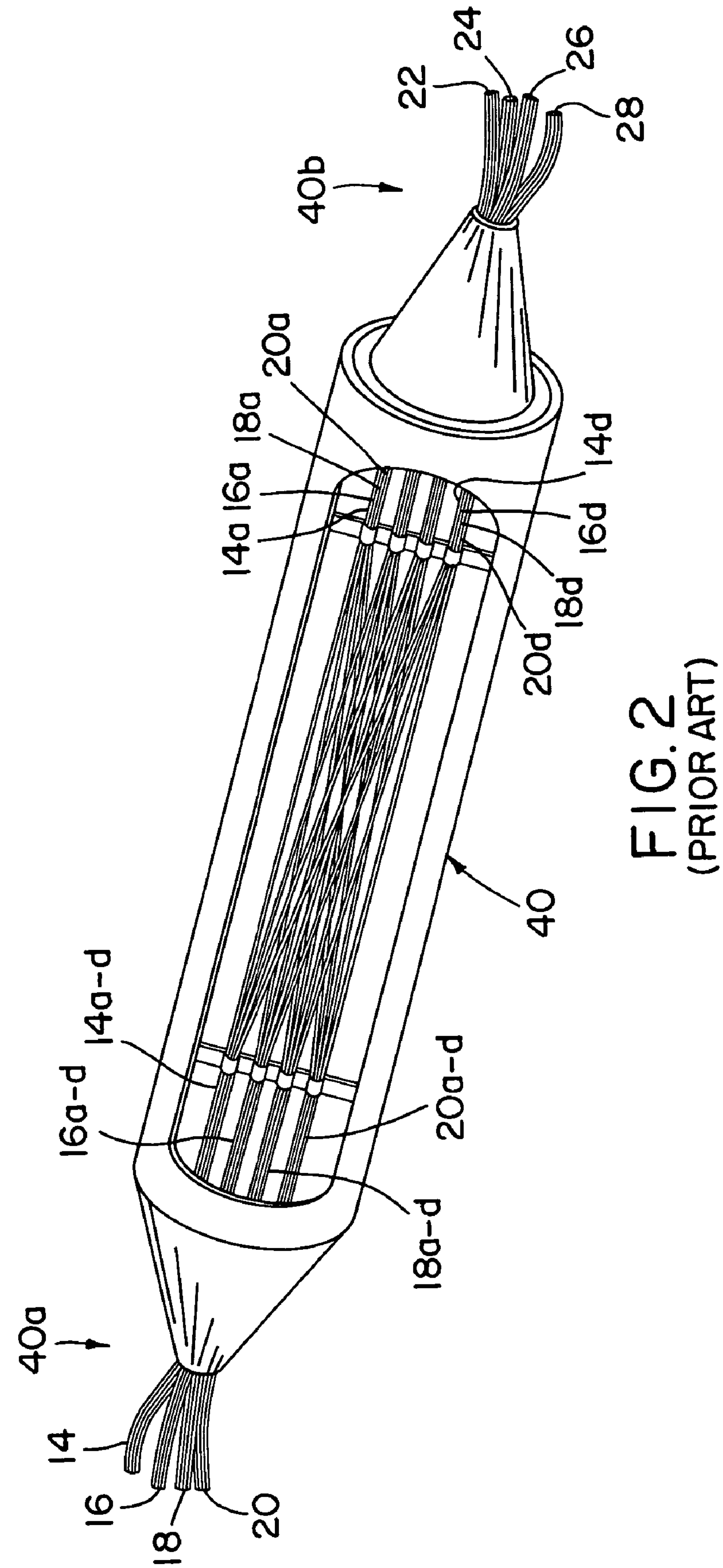
FIG. 2 is a diagram of an exemplary prior art fiber shuffling device for performing the optical shuffle of FIG. 1.
Figure 3:
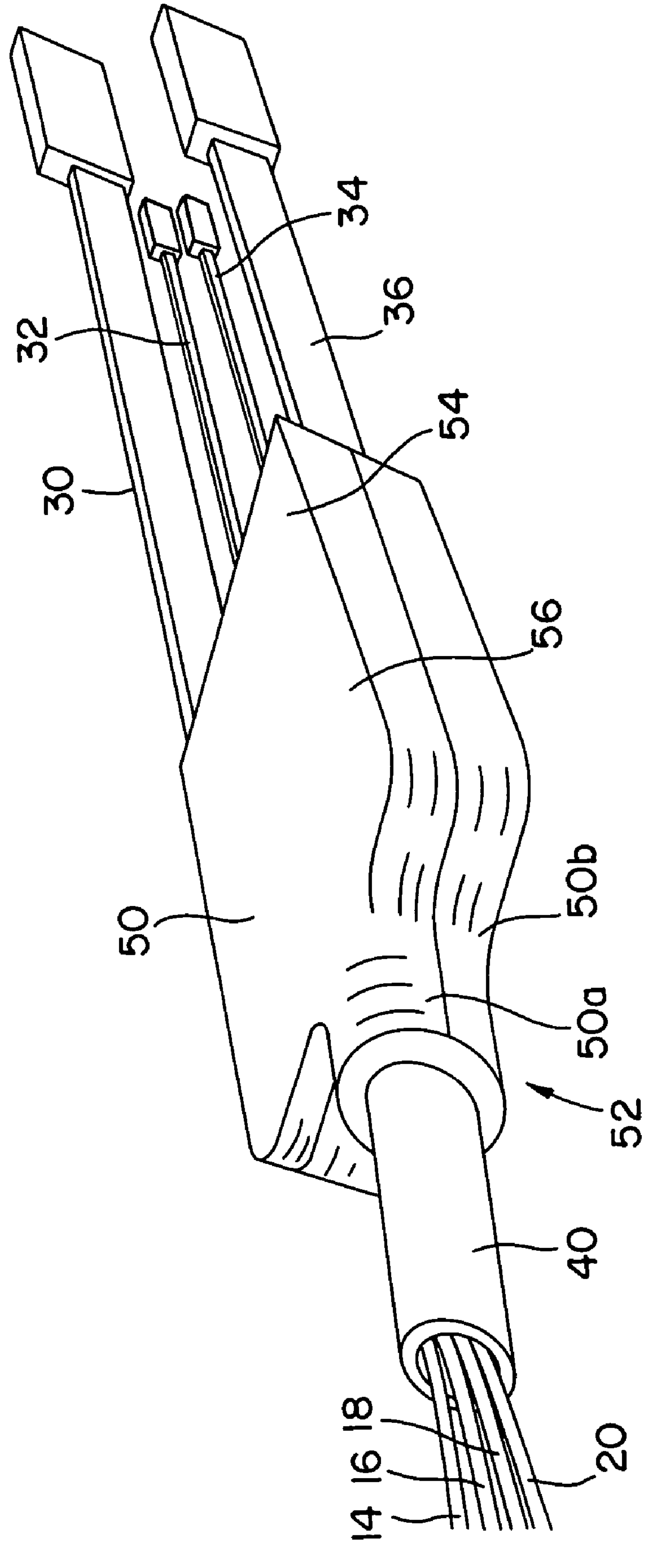
FIG. 3 is a perspective view of a strain relief unit in accordance with the present invention for use with the fiber shuffling device of FIG. 2.

FIG. 3 is a perspective view of an exemplary strain relief unit 50 in accordance with the present invention for connecting a jacketed bundle or ribbon of optical fibers to a fiber shuffling device 40. For illustrative purposes, the exemplary strain relief unit 50 of FIG. 3 is configured for use with the Schott Optical Shuffle™ device 40 of FIG. 2, although it should be understood that it can be used with any fiber shuffling device. The example of FIG. 3 is consistent with the example of FIG. 1 in that there are four bundles of input signal fibers 14, 16, 18, 20, and that each of these bundles is an unjacketed, ribbonized bundle of four optical fibers. However, it will be understood that the present invention is equally applicable to any number of input signal fibers and fiber bundles, whether ribbonized or unribbonized, and whether jacketed or unjacketed.

Figure 1:
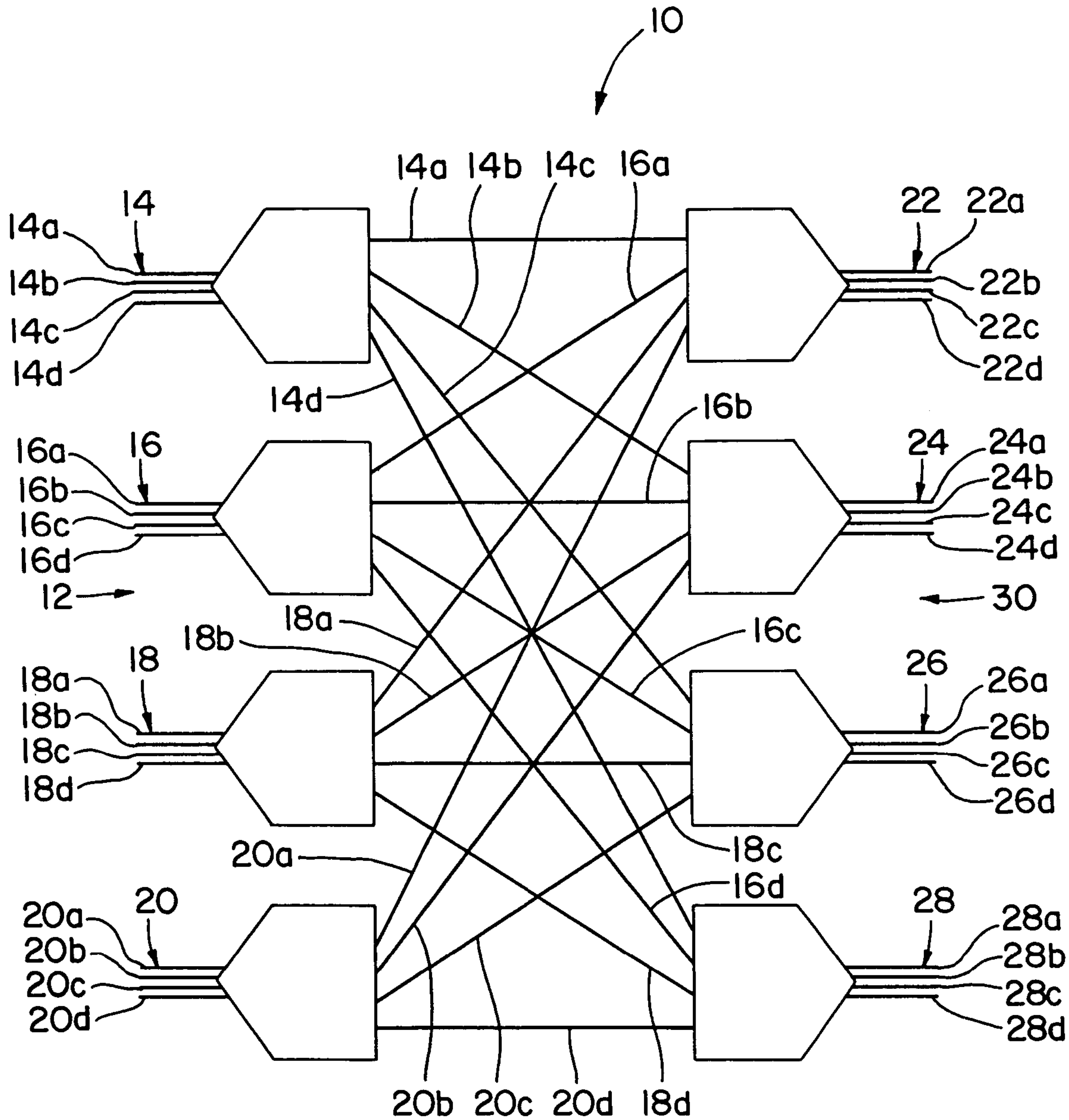
FIG. 1 is a symbolic diagram of an exemplary prior art optical shuffle regrouping bundles of input signal optical fibers into bundles of output signal optical fibers.
Figure 4:
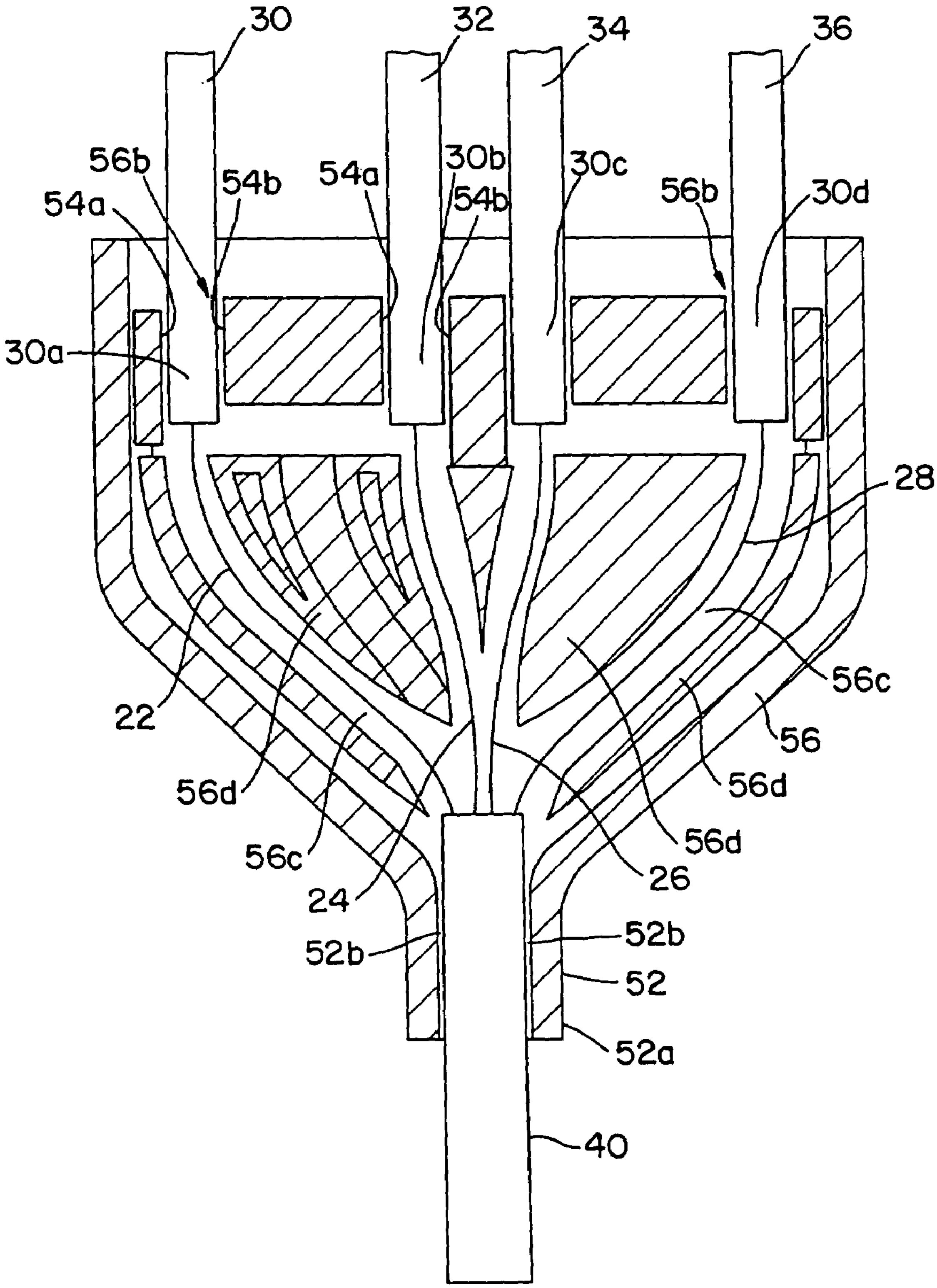
FIG. 4 is a top view of the strain relief unit of FIG. 3, showing an internal portion thereof.

In the example of FIGS. 3 and 4, the individual input signal optical fibers 14*a*–20 *d* are rearranged ("shuffled") according to the example of FIG. 1 to provide output signal optical fibers 22*a*–28*d* regrouped into four bundles of four fibers each. In this example, each output signal bundle is formed into a ribbon 22, 24, 26, 28 and provided with an outer jacket 30, 32, 34, 36. By way of example, each outer jacket 30, 32, 34, 36 includes an inner sleeve, such as a sleeve of woven Kevlar or other aramid yarn, surrounding the optical fiber ribbon and an outer sleeve, such as a PVC sleeve, positioned coaxially around the inner sleeve. However, it will be understood that the present invention is equally applicable to any number of output signal fibers and fiber bundles, whether ribbonized or unribbonized, provided that they are jacketed.

As shown in FIGS. 3 and 4, the strain relief unit 50 includes a first attachment member 52 adapted for attaching to the shuffling device 40, and a second attachment member 54 connected to the first attachment member and adapted for attaching to a portion of the jacket(s). In the examplary embodiment shown, a support member 56 supportively connects the first and said second attachment members 52, 54.

In the embodiment shown in FIGS. 3 and 4, the first attachment member 52 is configured to engage and retain the fiber shuffling device 40. The exemplary strain relief unit 50 of FIGS. 3 and 4 has a first attachment member 52 configured to include a tube 52*a* extending from support member 56 to engage the fiber shuffling device 40. The tube 52 has an inner surface 52*b* adapted to receive the fiber shuffling device 40 in frictional or other engagement for attaching the fiber shuffling device 40 to the support member 56. As shown in FIGS. 3 and 4, the fiber shuffling device 40 is connected by frictional engagement to the first attachment member 52.

The first and second attachment members 52, 54 and connected so that a tensile load applied to one attachment member is at least partially transferred to the other attachment member. For example, the attachment members 52, 54 may be connected by an elastically resilient, deformable or rigid member, such as a substrate, housing, etc. In the exemplary embodiment shown the first and second attachment members 52, 54 are connected by a support member 56 that includes a housing 56 having an opening 56*b* adapted to receive a portion 30*a*, 30*b*, 30*c*, 30*d* of the output signal optical fiber jacket 30, 32, 34, 36. More specifically, the support member 56 is integrally formed with the first and second attachment members 52, 54 as a unit. In the embodiment of FIGS. 3 and 4, there are a plurality of openings 56*b*, one for each respective output signal optical fiber ribbon 22, 24, 26, 28. Optionally, as shown in FIGS. 3 and 4, the housing 56*a* includes first and second portions 50*a*, 50*b* engagable with one another to enclose a portion of the fiber shuffling device 40 and a portion of the optical fiber ribbons extending therefrom. The first and second portions 50*a*, 50*b* are shown engaged in FIG. 3.

The housing 56*a* defines an internal channel 56*c* positioned to extend from the tube 52*a* to a position at opening 56*b* between the first and second contact surfaces 54*a*, 54*b*. The channel 56*c* is adapted to receive and guide a segment of optical fiber ribbon 22, 24, 26, 28 from the fiber shuffling device 40 to a corresponding opening 56*b* in a manner limiting bending of the ribbons to acceptable levels. In the embodiment shown, there are a plurality of discrete channels 56*c*, separated by housing walls 56*d*, for accommodating the plurality of output signal optical fiber ribbons 22, 24, 26, 28.

The second attachment member 54 includes first and second contact surfaces 54*a*, 54*b* positioned adjacent to one another in spaced relation within said opening 56*b*, said contact surfaces being spaced apart so as to be frictionally engagable with a portion 30*a*, 32*a*, 34*a*, 36*a* of each corresponding jacket 30, 32, 34, 36 for attaching the corresponding optical fiber ribbon to the housing 56*a*. As mentioned above, each jacket defines an inner sleeve surrounding said optical fiber ribbon and an outer sleeve positioned coaxially around the inner sleeve. The inner sleeve has interlaced high strength fibers engagable with the contact surfaces 54*a*, 54*b* by means of friction, adhesion, mechanical interengagement, etc.

In use, a subassembly including the input signal fibers/ribbons, fiber shuffling device and output signal fibers/ribbons may be assembled as known in the art. Application of a jacket to ribbonized or unribbonized bundles of optical fibers is well known in the art.

The strain relief unit 50 may then be provided on the subassembly by manually laying out the subassembly on a portion 50*b* of the strain relief unit 50, effectively using this portion 50*b* as a backplane for routing and arrangement of optical fibers/ribbons. Specifically, the fiber shuffling device 40 is positioned within the tube 52*a* of portion 50*b,* with the output signal optical fiber ribbons 22, 24, 26, 28 positioned in respective channels 56*c* of the housing 56, between corresponding housing walls 56*d.* The channels 56*c* guide the output signal optical fibers/ribbons 22, 24, 26, 28 and support them in a manner preventing sharp bends or kinks that would tend to damage the individual optical fibers or disrupt signal propagation therealong. Jackets 30, 32, 34, 36 of the output signal optical fiber ribbons 22, 24, 26, 28 are then pressed into position with corresponding contact surfaces 54*a,* 54*b* of the openings 56*b* of the housing 56 such that corresponding portions 30*a,* 32*a,* 34*a,* 36*a* of the jackets are engaged by the contact surfaces 54*a,* 54*b*. Preferably, this engagement is effected through a friction fit. The other portion 50*a* of the strain relief unit 50 may then be mated to portion 50*b*. Portions 50*a* and 50*b* may be joined in any suitable manner, such as by adhesive, welding, or by interlocking or non-interlocking mechanical fastening devices, as generally known in the art. In this manner, the strain relief unit 50 rigidly attaches the fiber shuffling device 40 to the jackets 30, 32, 34, 36 of the output signal optical fiber ribbons 20, 22, 24, 26. Accordingly, the strain relief unit 50 provides a direct connection between the jackets and the shuffling device, and any load imposed on the jacketed fiber/ribbon is borne by the strain relief unit 50, rather than by the length of fiber/ribbon between the end of the shuffling device and the beginning of the jacket.

Similarly, the input signal optical fibers/ribbons may be similarly fitted with a strain relief unit 50, provided that the input signal optical fibers/ribbons are jacketed.

It should be noted that such fibers/ribbons have traditionally been routed through a shuffling device before terminating the individual fibers or ribbons to suitable connectors. Because there are often problems in properly terminating the fibers/ribbons to connectors, the yield of connectorized fibers is less than 100%. Accordingly, many subassemblies of connectorized fibers/ribbons and shuffling devices are regularly found defective and discarded. For example, if the yield for terminating a ribbon to a connector is 95% (5% terminated incorrectly), for a device having four input ribbons and four output ribbons, the yield of connectorized subassemblies is approximately 66% (that is, $0.95^8$).

Applicant has found that the yield for connectorized subassemblies can be improved by connectorizing ribbons, e.g. the input signal ribbons, before routing the fibers of such ribbons through the shuffling device. In other words, only pigtails of connectorized non-defective fibers/ribbons are routed through a shuffling device. In this manner, the subassemblies are formed with half of the ribbons, e.g. the input ribbons, having terminations known to be non-defective (effectively, a 100% yield). This leaves only the output ribbons to be connectorized after forming a subassembly including the shuffling device. Accordingly, in the example above, the yield of connectorized subassemblies increases from approximately 66% to approximately 81% (that is, $0.95^4$). Accordingly, fewer shuffling devices, optical fibers/ribbons and connectors need be discarded.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A strain relief unit usable to connect a fiber shuffling device to a plurality of optical fiber ribbons, each of said plurality of optical fiber ribbons having a respective jacket, said strain relief unit comprising:

a first attachment member adapted for secure attachment to said fiber shuffling device;

a second attachment member connected to said first attachment member and adapted to form a discrete connection to a portion of said jacket of each respective one of said plurality of optical fiber ribbons; and a rigid support member connecting said first and said second attachment members;

said strain relief unit thereby providing a direct connection between said jackets and said fiber shuffling device, a load imposed on the jackets being borne by said strain relief unit rather than the optical fibers.

2. The strain relief unit of claim 1, further comprising:

a fiber shuffling device, said fiber shuffling device being connected to said first attachment member.

3. The strain relief unit of claim 2, wherein said fiber shuffling device comprises a Schott Optical Shuffle device.

4. A strain relief unit usable to connect optical fiber ribbon having a jacket with a fiber shuffling device, said strain relief unit comprising:

a first attachment member adapted for attaching to said fiber shuffling device;

a second attachment member connected to said first attachment member and adapted for attaching to a portion of said jacket; and a support member connecting said first and said second attachment members;

wherein said support member comprises a housing and said first attachment member comprises a tube extending from said housing, said tube having an inner surface adapted to receive said fiber shuffling device in frictional engagement for attaching said fiber shuffling device to said housing, said housing further having an opening adapted to receive said portion of said optical fiber ribbon, said second attachment member having first and second contact surfaces being positioned adjacent to one another in spaced relationship within said opening, said contact surfaces being spaced apart so as to be frictionally engagable with said jacket for attaching said optical fiber ribbon to said housing.

5. The strain relief unit of claim 4, further comprising a channel positioned within said housing and extending from said tube to a position at said opening between said first and second contact surfaces, said channel being adapted to receive and guide a segment of optical fiber ribbon from said fiber shuffling device to said opening.

6. The strain relief unit of claim 4, further comprising a plurality of said first and second contact surfaces, each arranged in spaced relation with one another within said opening, each of said first and second contact surfaces being spaced apart so as to be frictionally engagable with a jacket of a respective optical fiber ribbon for attaching a plurality of said optical fiber ribbons to said housing.

7. The strain relief unit of claim 4, further comprising a plurality of channels positioned within said housing, each of said channels extending from said tube to a respective position at said opening between a respective pair of said contact surfaces, each channel being adapted to receive and guide an optical fiber ribbon from said fiber shuffling device to said opening.

8. The strain relief unit of claim 4, wherein said housing comprises first and second portions engagable with one another to enclose a portion of said fiber shuffling device and a portion of said optical fiber ribbons extending therefrom.

9. A strain relief unit usable to connect optical fiber ribbon having a jacket with a fiber shuffling device, said strain relief unit comprising:

a first attachment member adapted for attaching to said fiber shuffling device;

a second attachment member connected to said first attachment member and adapted for attaching to a portion of said jacket; and a support member connecting said first and said second attachment members;

wherein said support member comprises a housing and said first attachment member comprises a tube extending from said housing, said tube having an inner surface adapted to receive said fiber shuffling device in frictional engagement for attaching said fiber shuffling device to said housing, said housing further having an opening adapted to receive said portion of said jacket, said jacket comprising an inner sleeve surrounding said optical fiber ribbon and an outer sleeve positioned coaxially around said inner sleeve, first and second contact surfaces being positioned opposite to one another in spaced relation within said opening, said contact surfaces being spaced apart so as to be engagable with said inner sleeve for attaching said jacket to said housing.

10. The strain relief unit of claim 9, wherein said inner sleeve comprises interlaced high strength fibers, said high strength fibers being engagable with said contact surfaces by means of an adhesive bond.

11. A strain relief unit, comprising:

a fiber shuffling device having a plurality of optical fiber ribbons extending therefrom, each of said plurality of optical fiber ribbons having a respective jacket extending over a portion thereof distally from said fiber shuffling device;

a housing having oppositely disposed ends;

a tube extending from one end of said housing, said tube having an inner surface adapted to receive said fiber shuffling device in frictional engagement for attaching said fiber shuffling device to said housing, an opening positioned at said other end of said housing and facing said tube, said opening having a plurality of paired first and second contact surfaces positioned adjacent to one another in spaced relation, each of said jackets being positioned between a respective pair of said contact surfaces and frictionally engaged therewith for attaching said jacket to said housing.

12. The strain relief unit of claim 11, further comprising a plurality of channels positioned within said housing, each of said channels extending from said tube to a respective position at said opening between a respective pair of said contact surfaces, each channel being adapted to receive and guide an optical fiber ribbon from said fiber shuffling device to said opening.

13. The strain relief unit of claim 11, wherein said fiber shuffling device comprises a Schott Optical Shuffle device.

14. The strain relief unit of claim 11, wherein said housing comprises first and second portions engagable with one another to enclose a portion of said fiber shuffling device and a portion of said optical fiber ribbons extending therefrom.

15. A strain relief unit comprising:

a fiber shuffling device having a plurality of optical fiber ribbons extending therefrom, each of said plurality of optical fiber ribbons having a respective jacket extending over a portion thereof distally from said fiber shuffling device;

a first attachment member adapted for attaching to said fiber shuffling device, said first attachment member having an inner surface adapted to receive said fiber shuffling device in frictional engagement for attaching said fiber shuffling device to said first attachment member; and a second attachment member connected to said first attachment member, said second attachment member having an opening positioned opposite said first attachment member, said opening having a plurality of paired first and second contact surfaces positioned adjacent to one another in spaced relationship, each of said jackets being positioned between a respective pair of said contact surfaces and frictionally engaged therewith for attaching said jacket to said housing.

16. The strain relief unit of claim 15, wherein said fiber shuffling device comprises a Schott Optical Shuffle device.

17. The strain relief unit of claim 15, wherein said second attachment member is connected to said first attachment member by a support member connecting said first and said second attachment members.

18. The strain relief unit of claim 17, wherein said support member comprises a housing, said strain relief unit further comprising a plurality of channels positioned within said housing, each of said channels extending from said first attachment member to a respective position at said opening between a respective pair of said contact surfaces, each channel being adapted to receive and guide an optical fiber ribbon from said fiber shuffling device to said opening.

19. The strain relief unit of claim 17, wherein said support member comprises a housing comprising first and second portions engagable with one another to enclose a portion of said fiber shuffling device and a portion of said optical fiber ribbons extending therefrom.

* * * * *